No. 632,146. Patented Aug. 29, 1899.
L. RÉMONDY & P. HALLOT.
BRAKE APPARATUS FOR VEHICLES.
(Application filed June 24, 1898.)
(No Model.) 3 Sheets—Sheet 1.
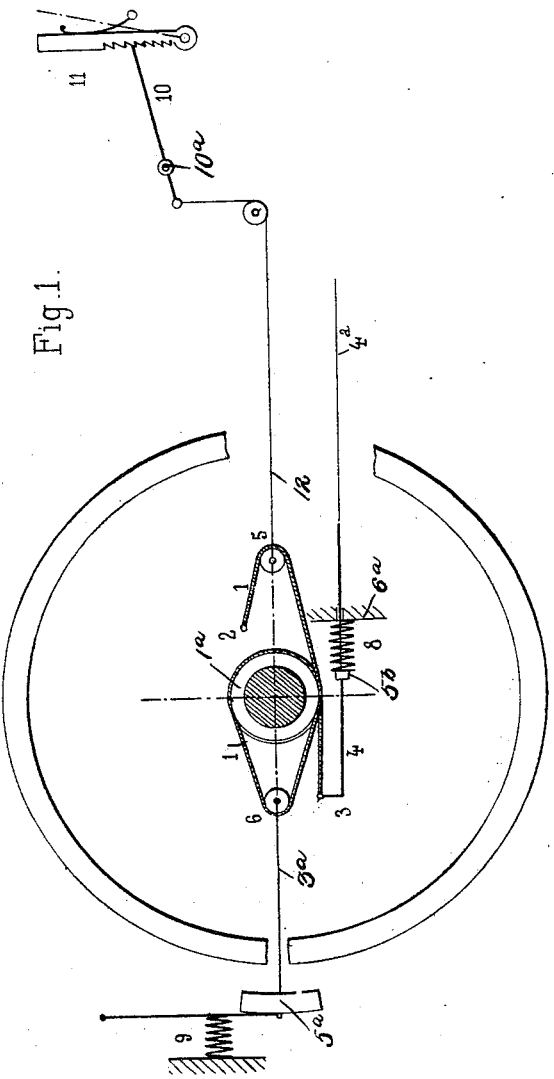
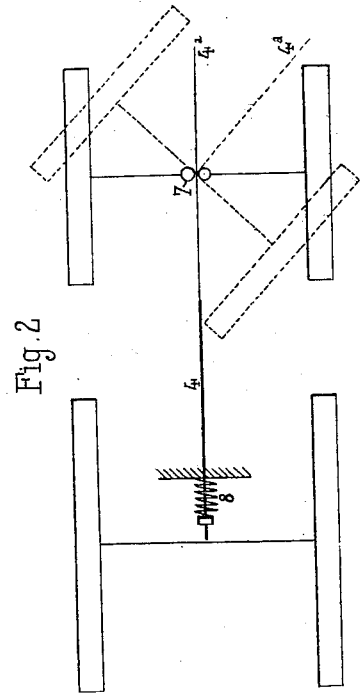

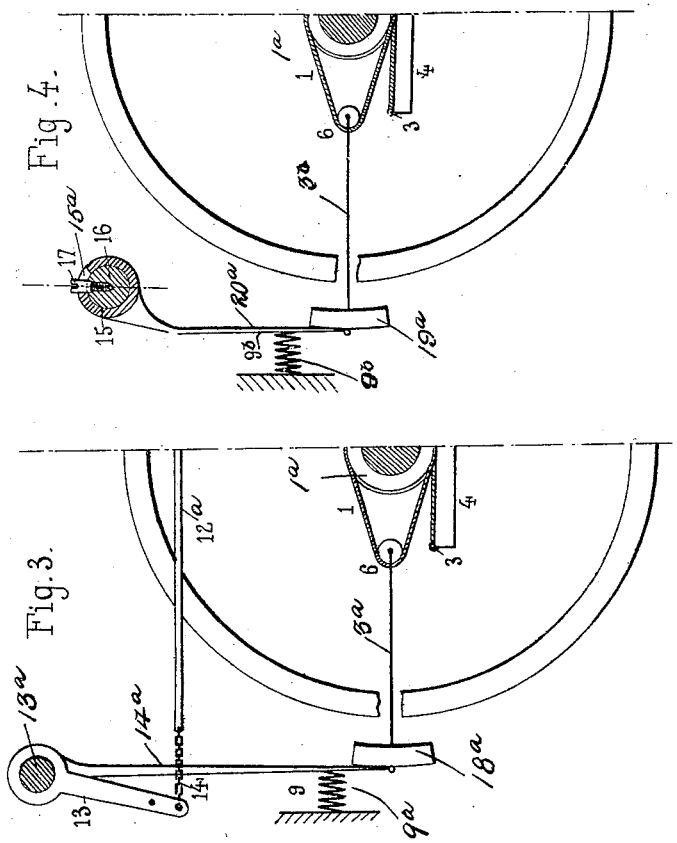

No. 632,146. Patented Aug. 29, 1899.
L. RÉMONDY & P. HALLOT.
BRAKE APPARATUS FOR VEHICLES.
(Application filed June 24, 1898.)
(No Model.) 3 Sheets—Sheet 3.
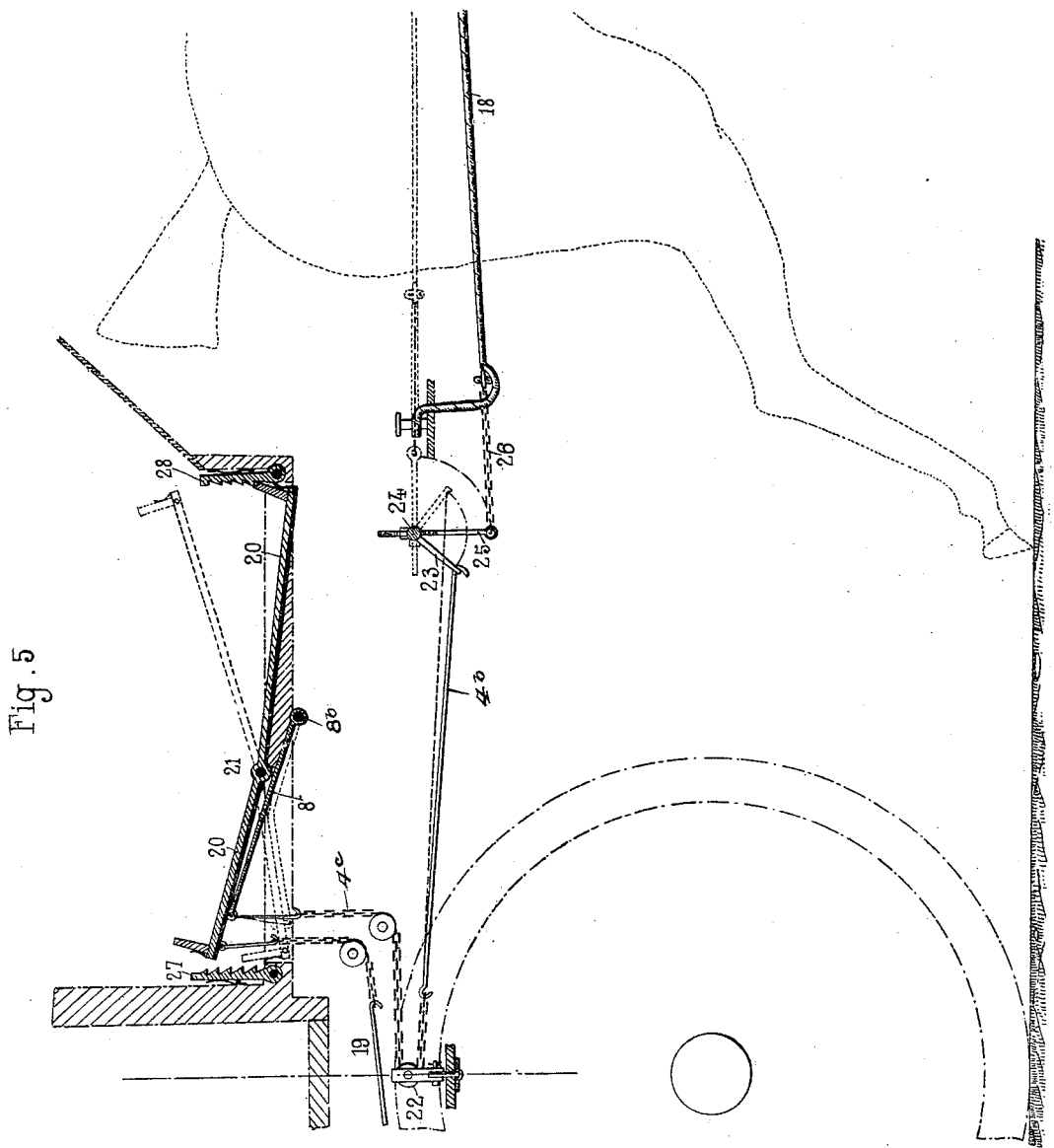

UNITED STATES PATENT OFFICE.

LÉON RÉMONDY, OF VINCENNES, AND PAUL HALLOT, OF VANNES, FRANCE.

BRAKE APPARATUS FOR VEHICLES.

SPECIFICATION forming part of Letters Patent No. 632,146, dated August 29, 1899.

Application filed June 24, 1898. Serial No. 684,413. (No model.)

*To all whom it may concern:*

Be it known that we, LÉON RÉMONDY, of 16 Rue du Progrès, Vincennes, and PAUL HALLOT, of 47 Rue Sené, Vannes, France, artillery lieutenants, citizens of France, have invented certain new and useful Improvements in or Relating to Brake Apparatus for Road and other Vehicles, of which the following is a specification.

The chief object of this invention is to provide new and improved means for automatically operating the brakes of a wheeled vehicle through the medium of the forward momentum of the latter, relieving the draft strain on draft devices, whereby the brakes are automatically applied with a gradually-increasing force proportionate to the momentum of the entire vehicle as it travels forward. To accomplish this object, our invention involves the features of construction, the combination or arrangement of parts, and the principles of operation hereinafter described and claimed, reference being made to the accompanying drawings, in which—

Figure 1 is a detail sectional side elevation of sufficient of a wheeled vehicle and the brake mechanism to enable our invention to be understood. Fig. 2 is a diagrammatical plan view hereinafter explained. Fig. 3 is a detail sectional side elevation showing the manner of applying our invention to existing vehicles. Fig. 4 is a similar view showing another manner of applying our invention to existing vehicles; and Fig. 5 is a similar view showing the draft mechanism and cable tightening and loosening devices at the front of a road-vehicle, the brake, the brake-operating cable, and some other parts being omitted, as they are fully shown in Fig. 1.

In order to enable those skilled in the art to make and use our invention, we will now describe the same in detail, referring to the drawings, wherein—

The numeral 1 indicates a cable passing around a hub $1^a$, rotating with the axle or with the wheel, and also around a pulley 6, having a suitable connection, such as a rod $3^a$, with the brake $5^a$ or the brake-beam, as the case may be. The cable is fastened at one end, as at 2, to a fixed part of the vehicle, and after looping or passing around the pulley or sheave 5, the axle or hub $1^a$, and the pulley or sheave 6 its other end is secured to the rear end of a draft-bar 4, as at 3. This draft-bar, as shown in Fig. 1, passes through a spiral power-spring 8 and is provided with a collar $5^b$, bearing against one end of the spring, the other end of the latter being supported by a fixed part $6^a$ of the vehicle. The draft-bar 4 is the medium by which the wheeled vehicle is moved. It is shown as connected to a draft-cable $4^a$, forming part of the draft devices, so that the draft-bar in fact sustains the entire traction strain or pull which is transmitted to the vehicle through the spring 8. The pulley or sheave 5 is connected by a flexible connection 12, such as a chain, with the short arm of a lever 10, pivoted between its ends, as at $10^a$, to a part of the vehicle, so that the lever is within convenient reach of and can be actuated by the driver or attendant. The long arm of the lever 10 is adapted to engage and be held or locked by a spring-pressed ratchet-plate 11.

While the power required to move the vehicle exceeds the resilient power or expansive force of the power-spring 8, the latter is compressed and the brakes remain off; but the instant the momentum or speed of the vehicle exceeds the speed of the draft-animals or other medium the power-spring expands and acting against the collar $5^b$ moves the draft-bar 4 rearward, thereby pulling on the end 3 of the cable, so that the latter draws the pulley or sheave 6 forward to automatically apply the brake to an extent just sufficient to restore the equilibrium which was destroyed. In other words, the brake is applied with gradually-increasing force in proportion to the momentum of the vehicle.

Through the medium of the lever 10, ratchet-plate 11, connection 12, and pulley or sheave 5 the cable may be tightened to apply the brake or to more or less regulate the power of the brake. A spring 9, suitably applied, serves to return the brake to normal position.

In Fig. 2 the vehicle is designed to have a pivoted front axle, like an ordinary carriage, in which event the flexible draft-cable $4^a$, connected with the draft-bar 4, passes between centrally-arranged guide-rollers 7 to permit the front axle to turn, while preserving operative connection of the draft-cable with the draft-bar. The parts of our invention not shown in Fig. 2, which is merely a diagram, will be the same as described with reference to Fig. 1.

Our invention may be applied to existing carriages having ordinary brakes, as represented in the modifications, Fig. 3 and 4. In Fig. 3 the numeral 13 indicates a lever-arm secured to the ordinary transverse shaft $13^a$, having a pendent lever $14^a$, carrying the brake or beam $18^a$, pressed toward the vehicle-wheel by a spring $9^a$. The lever-arm 13 is connected by a chain 14 with the usual longitudinal brake-rod $12^a$, adapted to be operated by the driver or attendant. The brake $18^a$ is connected by a rod $3^a$ with the pulley or sheave 6, which is engaged with the cable 1, all the same as described with reference to Fig. 1. In Fig. 4 the ordinary brake shoe or beam $19^a$ is supported by a lever $20^a$, having a boss 15 loosely mounted on a transverse shaft 16. The lever $20^a$ is pressed toward the vehicle-wheel by spring $9^b$, and the boss 15 has a slot $15^a$, through which a set-screw 17 passes into the shaft 16. The brake $19^a$ is connected by rod $3^b$ with the pulley or sheave 6, engaged with the cable 1, all the same as described with reference to Fig. 1.

In the modification shown in Fig. 5 the spring for applying the brake, similar to the spring 8, Fig. 1, is in the form of a leaf-spring $8^a$, secured at one end $8^b$ and constantly pressing upward against the short arm of a pedal-lever 20, pivoted near its center, as at 21. The short arm of the pedal-lever is connected to a connection 19, running back to and controlling a brake-operating cable the same as the cable 1 in Fig. 1. The draft-bar $4^b$ also connects at its rear end with the short arm of the pedal-lever through the medium of a chain $4^c$, passing around the guide pulley or sheave 22, and this draft-bar is attached at its front end to a lever-arm 23, secured to a transverse shaft 24, having a lever-arm 25, to which the draft traces or devices 18 are connected by a chain 26. The principle or mode of operation is substantially the same as described with reference to Fig. 1. The instant the draft strain on the traces or draft devices 18 ceases the spring $8^a$ is released and acts to raise the short arm of the pedal-lever 20, thereby pulling the connection 19 to actuate the brake-operating cable, which latter is the same as the cable 1, Fig. 1. The long arm of the pedal-lever can be depressed by the driver or attendant to apply the brake, and the lever can be held or locked in any desired position by spring-pressed ratchet-plates 27 and 28 to regulate the power of the brake.

It will be observed that while our improved brake-operating mechanism is automatic in its action, as explained, it is also under control of the driver or attendant through the medium of the levers 10 or 20, as before explained.

Having thus described our invention, what we claim is—

1. The combination with a vehicle-brake, of a brake-operating cable, a connection between the latter and the brake, a longitudinally-movable draft-bar connected with the cable and exerting no pull thereupon under the draft strain, and a power device engaged with the draft-bar, held inactive by the draft strain and released to move the draft-bar rearward and operate the cable to apply the brake, by the momentum of the vehicle relieving the draft strain, substantially as and for the purposes described.

2. The combination with a vehicle-brake, and a rotating hub, of a brake-operating cable secured at one end and passing around said hub, a draft-bar connected with the other end of said cable, a connection between the latter and the brake, and a yielding power device moving the vehicle through the draft-bar, held inactive by the draft strain to hold the brake off and released by the momentum of the vehicle relieving the draft strain on the vehicle, to draw or pull the cable around the hub and apply the brake with gradually-increasing force, proportionate to the momentum of the vehicle, substantially as described.

3. The combination with a vehicle-brake, and a rotating hub, of a brake-operating cable secured at one end, and looped around said hub, a draft-bar connected with the other end of said cable, a connection between one looped part of the cable and the brake, a yielding power device acting on the draft-bar, held by the draft strain to hold the brake off and released by the momentum of the vehicle relieving the draft strain on the draft-bar, to draw or pull the cable and apply the brake with gradually-increasing force, proportionate to the momentum of the vehicle, and a pivoted lever connected with another looped part of said cable and under control of the attendant or driver, substantially as described.

4. The combination with a vehicle-brake, of a brake-operating cable secured at one end, a draft-bar connected with the other end of the cable, a connection between the latter and the brake, and a power-spring engaged with said draft-bar, held under compression by the draft strain and released by the momentum of the vehicle relieving the draft strain, to draw or pull the cable and apply the brake with a gradually-increasing force, proportionate to the momentum of the vehicle, substantially as described.

5. The combination with a vehicle-brake, and a rotating hub, of a brake-operating cable secured at one end, and looped around said hub, a draft-bar connected with the other end of the cable, a connection between one looped part of the cable and the brake, a power-spring engaged with said draft-bar, held under tension by the draft strain and released by the momemtum of the vehicle relieving the draft strain, and a pivoted lever connected with another looped part of said cable and under control of the attendant or driver, substantially as described.

6. The combination with a vehicle-brake, of a brake-operating cable secured at one end, a draft-bar connected with the other end of the cable, opposite pulleys or sheaves about which said cable is looped, a connection between one pulley or sheave and the brake, a pivoted lever connected with the other pulley or sheave and actuated by the attendant or driver to draw or pull the cable, and a power-spring engaged with the draft-bar, held under tension by the draft strain and released to operate the cable and apply the brake, by the momentum of the vehicle relieving the draft strain, substantially as described.

In testimony whereof we have hereunto set our hands in presence of two subscribing witnesses.

LÉON RÉMONDY.
     PAUL HALLOT.

Witnesses as to Léon Rémondy:
 EDWARD P. MACLEAN,
 ALFRED FREY.

Witnesses as to Paul Hallot:
 JOS. I. BRITTAIN,
 J. WEILLAN.